Nov. 27, 1923.

A. GERMOT

PROCESS FOR THE DIRECT RECOVERY OF METALLIC ANTIMONY

Filed Sept. 11, 1922

Inventor:
A. Germot
By
Langner, Parry, Card & Langner
Attys.

Patented Nov. 27, 1923.

1,475,294

UNITED STATES PATENT OFFICE.

ANTONIN GERMOT, OF ASNIERES, FRANCE.

PROCESS FOR THE DIRECT RECOVERY OF METALLIC ANTIMONY.

Application filed September 11, 1922. Serial No. 587,450.

*To all whom it may concern:*

Be it known that I, ANTONIN GERMOT, citizen of the Republic of France, and residing at Asnieres, Seine, 56 Rue de la Marne, have invented a Process for the Direct Recovery of Metallic Antimony.

This invention relates to a process for directly obtaining metallic antimony by dissociation, at a high temperature, from its trisulphide.

The process consists in subjecting the trisulphide of antimony, in a closed vessel, to a high temperature, under the action of which it is dissociated or separated into its two elements, sulphur and antimony, without any formation of a sub-sulphide. The separation is complete and the metal obtained does not contain any trace of sulphur.

This latter may be collected at the end of the dissociating or separating apparatus in the form of sublimed sulphur.

Any apparatus which will enable the ore to be roasted at a sufficient temperature and to obtain its dissociation, can be employed for the purpose of carrying out the process forming the subject matter of the present invention.

By way of example, there is shown in the annexed drawing the diagram of an apparatus whereby the said process may be commercially effected.

Figure 1:
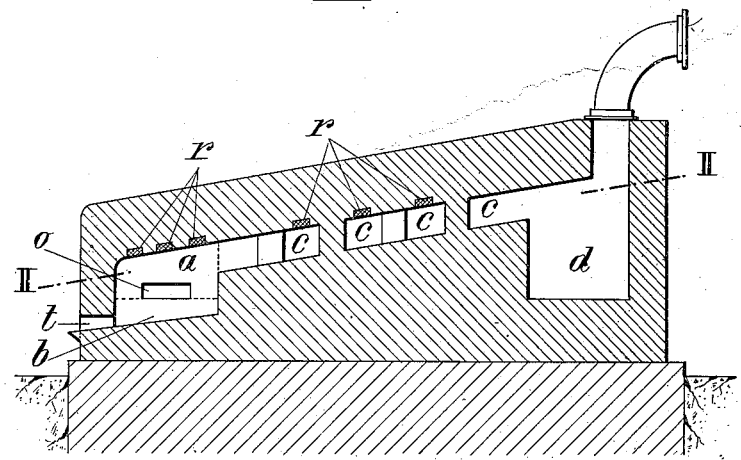
Figure 2:
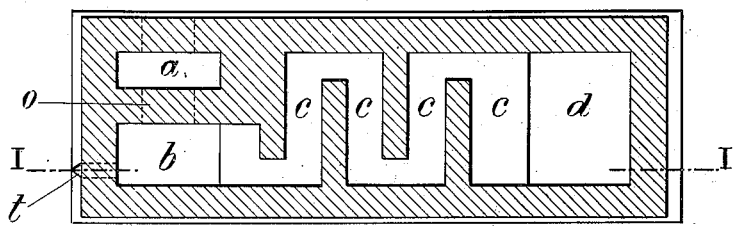

Fig. 1 of these drawings shows a longitudinal view taken on the line I, I of Fig. 2 of the apparatus in question, and Fig. 2 is a sectional plan taken on the line II, II of Fig. 1.

This furnace comprises two compartments $a$ and $b$, heated to any appropriate temperature by any known means, preferably by electric resistances $r$. The charging takes place in the compartment $a$, the dissociation or separation in the compartment $b$, the hearth of which communicates through an opening $o$ with the hearth of $a$ is at a lower level than that of $a$ so as to permit of the running out and the drawing off of the metal through the tap-hole $t$ without carrying over any sulphide.

The vapours of the sulphide not already dissociated and of the sulphur which are evolved during the operation, pass through the flue $c$, which is also heated by resistances $r$. The greater part of the sulphide vapours is dissociated in this flue, the metal formed flowing to the furnace $b$ to join that already produced, the sulphur being sublimed in a chamber $d$ provided for this purpose.

The antimony is collected through the tap-hole $t$ and the operation is thus continuous if the charging at $a$ be regulated in proportion to the flowing out of the metal.

Having now particularly described my invention and in what manner the same is to be performed what I claim is:

1. A process for the direct recovery of metallic antimony, from its sulphide, comprising heating the sulphide, out of contact with oxygen, to its temperature of dissociation, and separating out and collecting the metallic antimony by gravitation.

2. A process according to claim 1, any escaping dissociated sulphide vapor being subjected to a further heating out of contact with oxygen, to its dissociation temperature, the metal being separated out by gravity, and the dissociated sulphur being recovered by sublimation.

In testimony whereof I have signed my name to this specification.

ANTONIN GERMOT.